Oct. 30, 1956 L. W. BERRY 2,768,753
MULTIPLE SECTION ROTARY BED FILTER
Filed Oct. 22, 1954 4 Sheets-Sheet 1
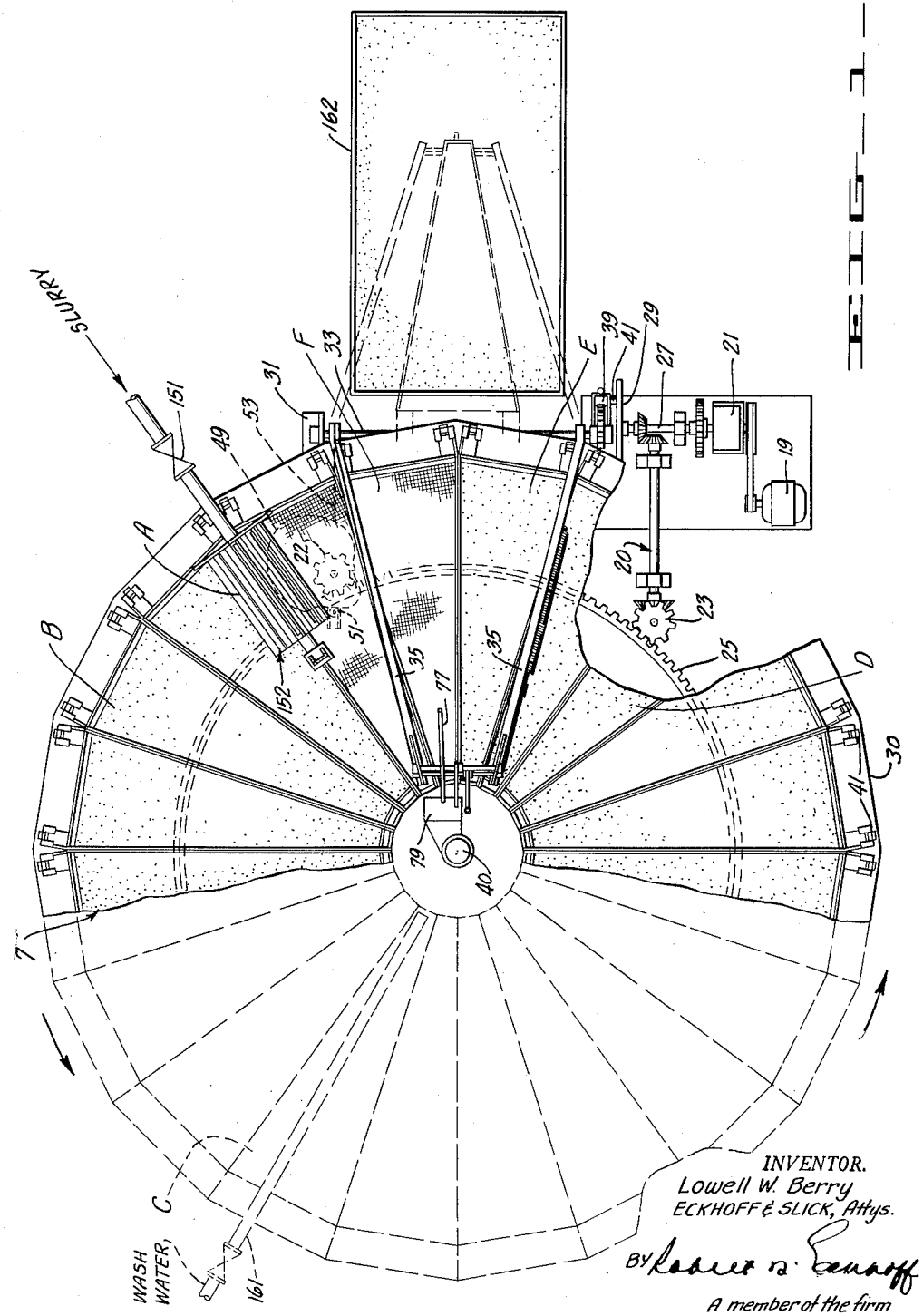
INVENTOR.
Lowell W. Berry
ECKHOFF & SLICK, Attys.

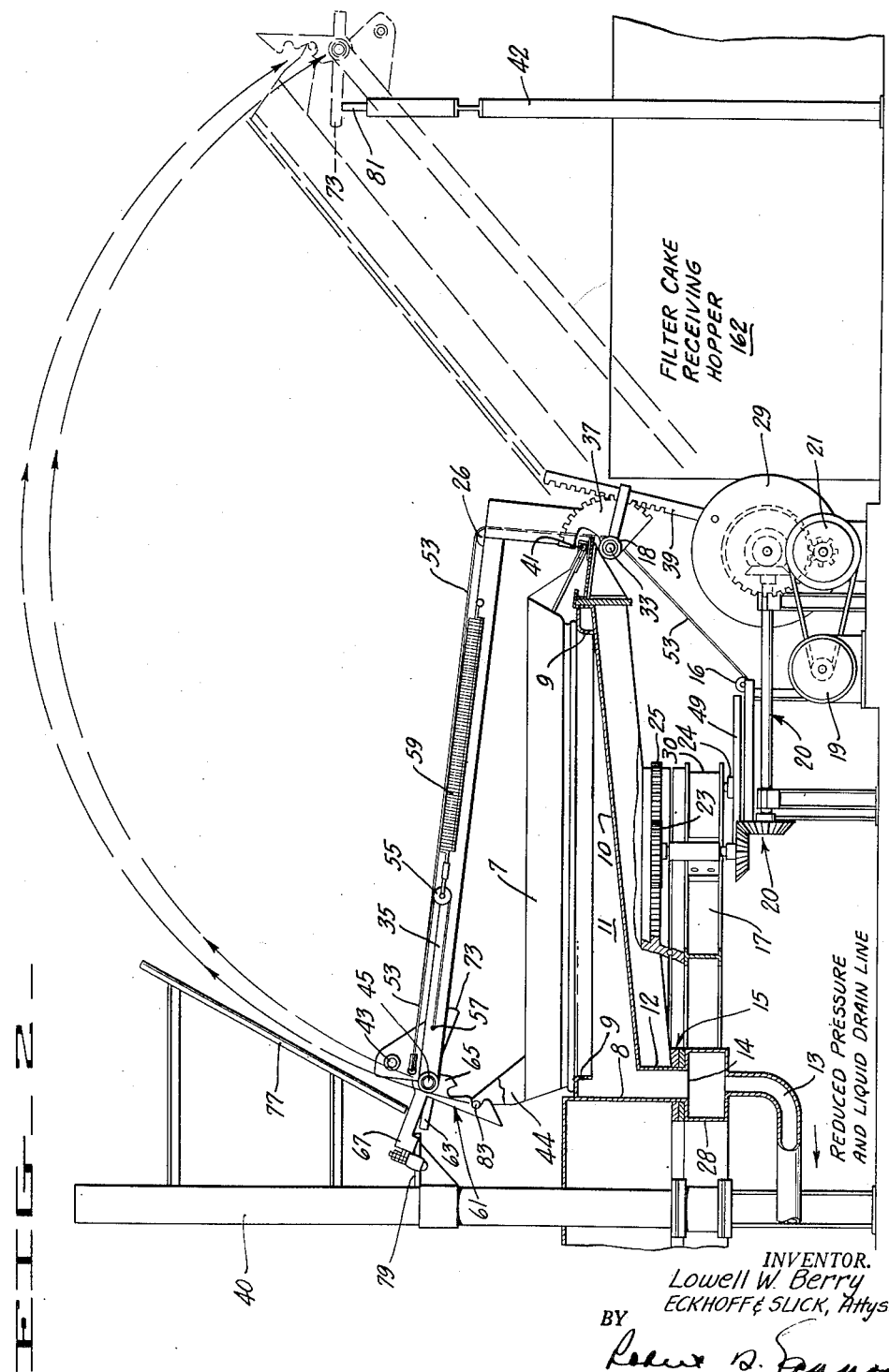

Oct. 30, 1956 L. W. BERRY 2,768,753
MULTIPLE SECTION ROTARY BED FILTER
Filed Oct. 22, 1954 4 Sheets-Sheet 3
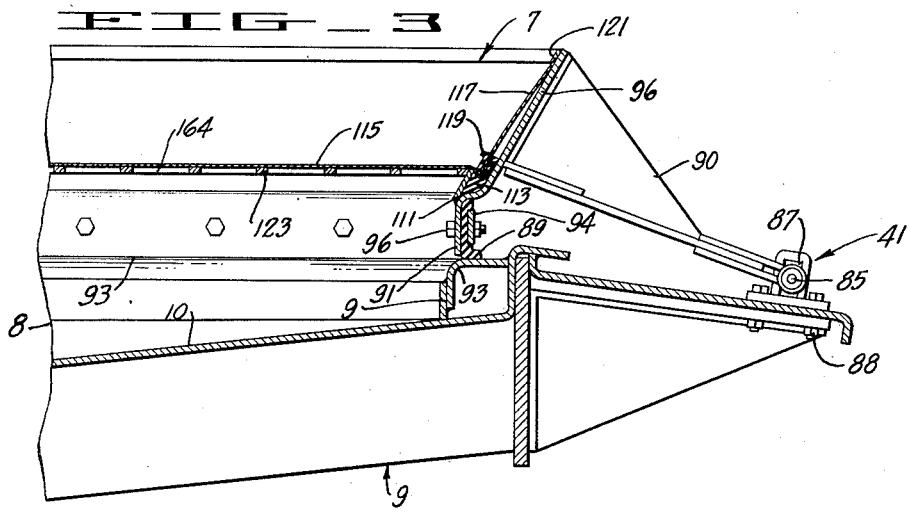
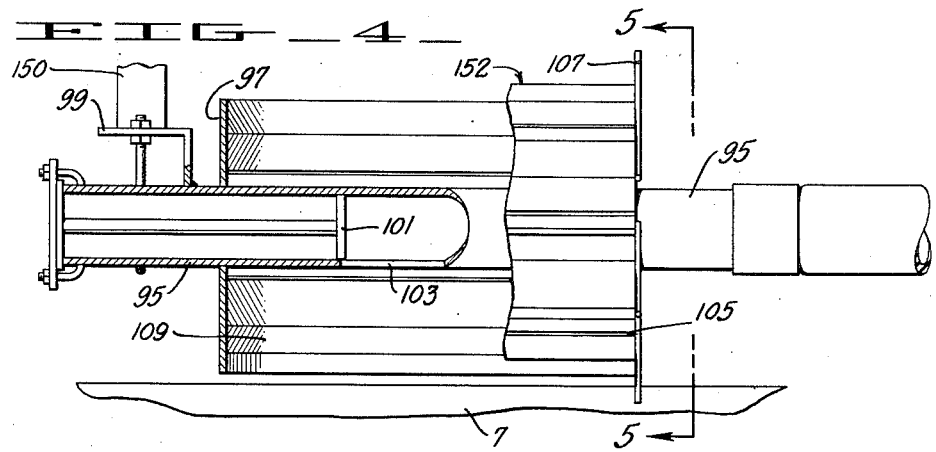
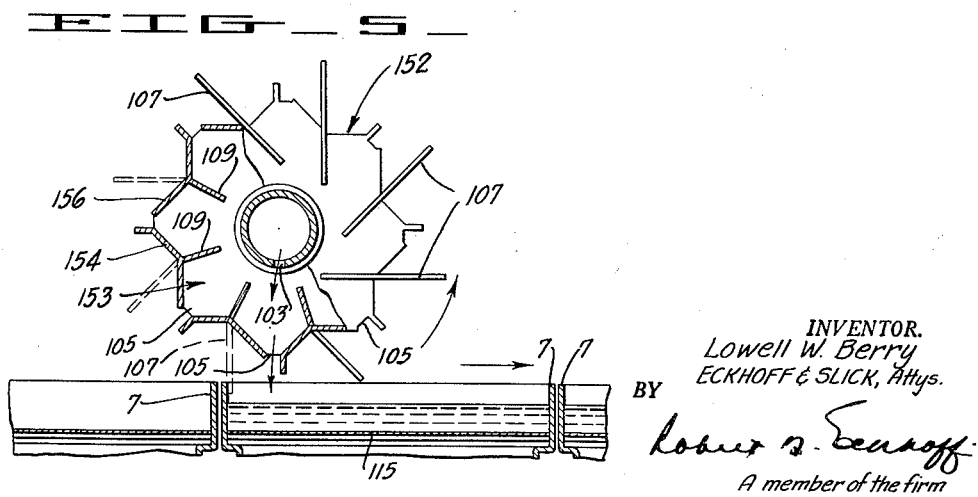
INVENTOR.
Lowell W. Berry
ECKHOFF & SLICK, Attys.
BY
Robert B. Eckhoff
A member of the firm Oct. 30, 1956 L. W. BERRY 2,768,753
MULTIPLE SECTION ROTARY BED FILTER
Filed Oct. 22, 1954 4 Sheets-Sheet 4
FIG_6_
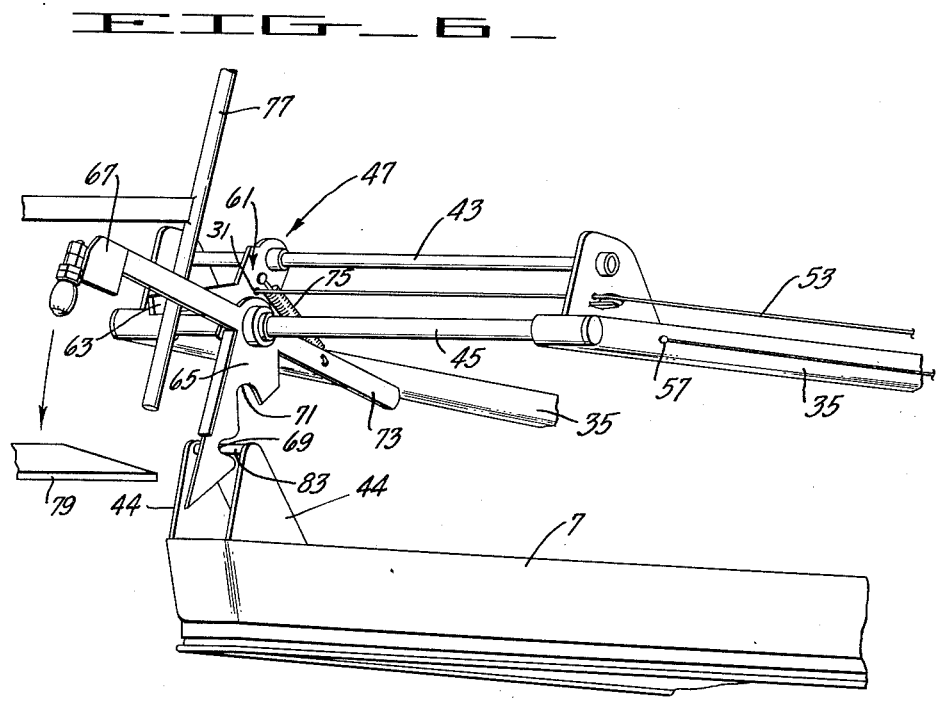
FIG_7_
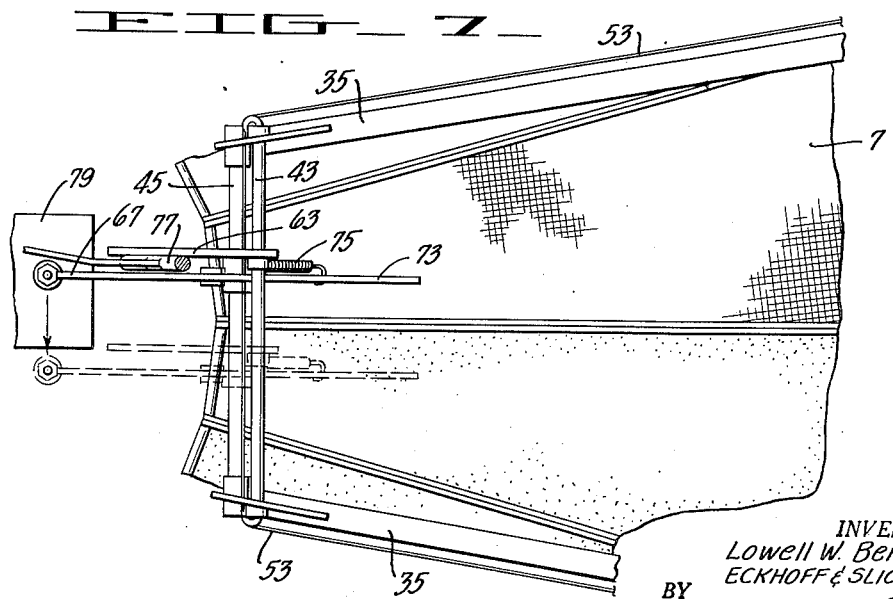
INVENTOR.
Lowell W. Berry
BY ECKHOFF & SLICK, Attys
A member of the firm.

United States Patent Office 2,768,753
Patented Oct. 30, 1956

2,768,753

MULTIPLE SECTION ROTARY BED FILTER

Lowell W. Berry, Piedmont, Calif.

Application October 22, 1954, Serial No. 464,065

9 Claims. (Cl. 210—202.5)

This invention relates to an improved continuous filter of the rotary table type.

It has been proposed heretofore to provide a circular table filter of the rotary type wherein the filter bed is provided by several pie-shaped pans, each separately mounted for rotation to discharge solids from each pan within the area of the filter. The axis of rotation of each pan has varied, e. g., in some filters it is near the center of the segment, in others, the axis of rotation has been on a radius of the table, while in others, the axis has been on a chord of the table.

In filters of this type, provision must also be made for receiving discharged solids within those confines of the filter where other necessary elements should be positioned for the most efficient operation. Also, in this type of filter, the solids are not as completely removed from each pan as is desired because each pan is swung about its central axis with the result that, although one-half of each bed swings away from the solids, the other half swings, in effect, against the solids; thus, the direction of motion of the pan does not assist in removing solids from the pan nor does the movement utilize the inertia of the material to assist in its discharge from the pan. Accordingly, these filters frequently require either an air or liquid blowback to dislodge forcibly the cake when this is at all tenacious.

In another type of filter, a screw conveyor is employed which extends generally radially across the filter so as to move the solid material off the bed without changing the horizontal position of the latter. The screw conveyor, however, does not completely remove the solids so that with some types of material a gradual filling in the openings of the filter cloth occurs, resulting in a need for prolonged washing to reopen the clogged filter cloth.

In addition to providing an improvement in removing solids from each filter pan following filtering operation, it is desirable that each filter pan drop back into position for filling, filtering and washing; to this same end, it is essential that each pan reseat itself on a seal so that when a reduced pressure is subsequently applied, the reduced pressure is effective in pulling liquid from the solids in the pan. The device of the present invention contemplates an improved pan-seal construction.

The filter of the present invention is further characterized in that it includes means for discharging a slurry into each pan without spilling of the slurry onto the contiguous edges of adjacent pans, thus maintaining the filter pan support surfaces clean and free from any accumulation of solids.

It has been previously mentioned that the filtering cycle includes forceful discharge of solids held upon the filter cloth. This requires that the cloth be suitably anchored in each pan so that the pull developed on the cloth when the cake is forcefully dumped will not pull the cloth loose. Further, in none of the rotary type cake dumping filters is there ready access to the underside of the filter cloth for counter-current washing or for removal of solids which may accumulate during filtration. The filter of the present invention includes an improved filter cloth mounting, one in which the cloth remains in place in use and which is accessible from its underside.

*Objects*

One of the objects of this invention is to provide a rotary filter wherein solids are removed from the filter pans by swinging each pan to a generally inverted position on one side of the filter to deposit the filter cake outside of the path of movement and the confines of the rotary filter.

Another object of this invention is the provision of a mechanism to lift each filter pan in sequence while the filter is in continuous rotation, swinging the pan to a generally inverted position, utilizing the momentum imparted to the cake during the swinging movement to discharge forcibly the cake from the pan.

Another object is the provision of a seal on the base of each filter pan enabling a reduced pressure to be applied and held on each pan after the pan has been filled with slurry to be filtered.

Another object is the provision of a fluid feed mechanism to discharge and distribute a fluid to be filtered within the area of a filter pan without leakage or spilling of fluid between the filter pans.

Another object is the provision of filter cloth securing means to hold the filter cloth firmly in place despite the pull developed on the cloth each time the cake is discharged.

A further object is the provision of a flexible hinge enabling the segment to seat on the pan seal with a uniform pressure at all points of contact.

A further object is the provision of a filter in which ready access can be had to the underside of the filter cloth and to the filter cloth supports for washing and removal of any deposits and accumulations.

The invention includes other objects and features of advantage, some of which, together with the foregoing, will appear hereinafter wherein the present preferred form of filter embodying the present invention is disclosed. In the drawings accompanying and forming a part hereof, Figure 1 is a semi-diagrammatic plan view of an apparatus constituting a preferred embodiment of the invention.

Figure 2 is a vertical sectional view of the apparatus shown in Figure 1.

Figure 3 is an enlarged sectional view showing the floating type hinge, the rubber seal on the contact edges of the filter pan, and the filter cloth anchoring method.

Figure 4 is a sectional view of the slurry distributing mechanism.

Figure 5 is a cross-section on the line 5—5 of Figure 4.

Figure 6 is a perspective view of the pick-up mechanism used to grasp the apex end of a filter pan and which lifts the filter pan through its dumping cycle.

Figure 7 is a plan view of the mechanism shown in Figure 6.

*General description*

In general, the structure of the filter includes a number of independent pie-shaped segments or filter pans arranged in the form of a circle in a horizontal plane. Each segmental pan is hinged at its base with two novel floating type hinges. The filter rotates continuously in a horizontal plane and slurry is fed into each empty pan through a slurry feed device which does not allow slurry to spill between adjacent pans. By the time a pan has filled, it has moved into a position where a reduced pressure is applied to one side of a pan to withdraw the liquid portion from the slurry. As the pan continues on its rotation, one or more wash applications may be applied to the surface of the cake and drawn through the cake by the applied reduced pressure. As the pan approaches that point in its path where the washed cake is to be discharged, air is permitted to enter the chamber under the pan to release the vacuum. A pick-up arm then engages the apex end of the pan and lifts the apex end upwardly and outwardly so the pan describes an arc of 120° to 150° about the hinged end until the pan is in a partially inverted position. The pan is brought to rest suddenly with the result that the filter cake is dislodged, partially because of gravity and partially because of the momentum acquired by the cake during the swinging motion of the pan which is effective on the sudden stopping of the pan to free the pan of the collected solids. The empty pan is then returned to its bed in the horizontal plane. The pick-up arm then picks up the next pan in sequence until the emptied pan is filled with slurry.

In resetting an empty filter pan in position on the bed, the floating hinge at the base of a pan permits the base end of the pan to lift slightly as the pan is reseated so that a uniform pressure is immediately exerted on all points of the pan seal; this enables a vacuum to be applied to the pan immediately after it has filled with slurry.

General structure

Referring more particularly to the drawings, a series of horizontally disposed segmental filter pans 7 are supported when at rest upon horizontal support members 9 which extend about the upper periphery of each compartmented collecting basin 11. In the form shown, twenty pans and twenty compartments are employed, but more or less can be used as desired. Each pan fits snugly and is pressure-sealed (as will be described) on a compartment so that the liquid portion of a slurry can be withdrawn by application of a reduced pressure to each compartment during its rotational travel, such pressure being applied to the underside of each pan and to the filter medium, i. e., a filter cloth, extended over the bottom of each pan 7. Each compartment 11 includes vertical annular sidewalls 8 and a bottom 10 draining into an outlet 12.

Atmospheric pressure is applied to the upper side of the filter in each pan and a reduced pressure to the underside of the filter in each pan through a vacuum pump (not shown) connected to line 13, annular drain box 28 and friction seal 15, the reduced pressure being applied, as will be described, over a selected portion of the rotational path of the filter. In that portion of the rotational path of the filter wherein each pan is discharged, reduced pressure application is cut off by drain closure 14. The conventional friction seal 15 also provides a fluid outlet for the rotating filter bed comprising the collecting basin 11, filter compartments 9 and filter pans 7. The filter bed includes a plurality of wheels (not shown) engaging the underside of rim 30. The bed is rotated at a desired speed by a motor 19 connected by conventional means such as a variable speed transmission 21 through the shaft 27 and associated shafts and gearing, generally indicated at 20, to a pinion 23, which in turn drives a ring gear 25 attached about the periphery of the filter bed.

Filter cycle

As the filter bed is continuously rotated, a preselected filter cycle is repeated during each revolution; for convenience in description, it will be assumed that the filter is rotating counter-clockwise in Figure 1. This cycle usually consists of (a) filling of each empty filter pan at Station A (Figure 1) as by a slurry feeder 152 (Figures 4 and 5); (b) as the filter bed rotates to Station B, the underside of each filled pan is subject to application of reduced pressure through line 13, seal 15, drain 12 and compartment 11; (c) by the time a filter pan has moved on to Station C, the liquid portion has been withdrawn from and a suitable wash is applied through a washer 161 (Figure 1) to the filter cake. For purposes of illustration, it will be assumed that only one wash is applied and that each filter pan is subjected to a vacuum until it reaches Station D, at which the discharge cycle starts; the vacuum on the pan is released as the pan moves into Station E, the closure 14 extending from about half-way between Stations D and E, and about half-way between Stations A and B; between Station E and Station F the pan is picked up, the solids are dumped from the pan into the receiving hopper 162, as indicated by dotted lines in Figure 1, and then returned to starting position.

The pan dumping means

Means are provided for lifting each pan about its base as it reaches Station E to discharge solids. This means includes a drive or lifting mechanism operated off a crank wheel 29 on shaft 27 and in synchronism with the rotation of the table. Since shaft 27 serves to drive both the ring gear 25 and crank wheel 29, rotation of wheel 29 is synchronized with the rotation of the table. The gear ratios are so selected that wheel 29 makes one revolution while gear 25 rotates through an arc of 18°; in the embodiment illustrated, wheel 29 makes twenty revolutions while the filter table makes one revolution.

A shaft 33 is supported for oscillation in a position tangential to the outer periphery of the filter bed while two arms 35 are secured at opposite ends of the shaft. Also attached to shaft 33 is a segment of a pinion 37 which is engaged with rack 39 which, in turn, is driven by crank pin 41 on wheel 29. It will be noted that the shaft 33 is located directly below the path of rotation of the presently described hinges 41 of the pans 7. The movement of shaft 33 is such that the arms 35 make one complete cycle each time a pan passes between Stations E and F. Thus, when a pan is in position at Station E, the arms 35 are in that position shown by solid lines in Figure 2; the arms then swing to that position shown in dash lines, and return to that position shown in solid lines, while the engaged pan has moved from Station E to Station F.

Mounted at the ends of arms 35 are two rods 43 and 45, on which a pick-up mechanism, generally designated 47, is free to slide. It will be noted that the rods 43 and 45 are of a length greater than that of the apex ends of two adjacent pans. Located beneath the table structure and driven by the ring gear 25 through a gear 22 and shaft 24 is a cam 49 with a cam follower 51; the cam 49 rotates at the same speed as wheel 29 and serves to control the position and movement of the pan pick-up member 47 on the rods 43 and 45, as will be described. The cam follower 51 is attached to the cable 53 which passes over pulleys 16, 18 and 26 and run along one of the arms 35 and is attached to plate 61 as at 31. The other end of cable 53 passes over idler pulley 55 and is anchored at 57, while a spring 59 maintains cable 53 tight at all times.

The pick-up member 47 includes a plate-like member 61 slidably mounted on rods 43 and 45 and having a guide bar 63 thereon. A hook member 65 slides on the rod 45 and is attached to the member 61, but is rotatable relative thereto. The hook member 65 includes hooks 69 and 71, a striker arm 67, and a lever arm 73. A tension spring 75 is attached between member 61 and arm 73 to bias the hooks 69 and 71 toward pan engaging position.

Mounted over the path of the filter on the fixed central standard 40 is a vertical guide 77 and a striker plate 79 (Figure 2), while mounted outside the path of the filter on a standard 42 is a second striker plate 81. Mounted above and at the end of each pan between brackets 44 is a rod 83.

Operation of the pan dumping means

In describing the operation of the pick-up mechanism, it will be assumed that arms 35 are descending and that hook 69 is engaged with a pan holding rod 83 on a pan which is being returned from cake discharge position. As the pan descends, cam 49 releases the tension on the cable 53 and enables spring 59 to urge the guide bar 63 into contact with the vertical guide 77 as the pan moves downwardly. As the pan approaches its final horizontal position, the arm 67 strikes plate 79, releasing the hook 69 from engagement with the pan holding rod 83. As the arms 35 descend further, guide bar 63 slides off the bottom end of guide 77, permitting the pick-up member 47 to be moved by spring 59 clock-wise in Figure 1 and from the full line to the dotted line position in Figure 7 and into position to pick up the next pan.

As the pick-up mechanism 47 arrives at a position directly over the next pan, striker arm 67 slides off the plate 79, permitting spring 75 to draw the hook 69 into contact with the bar 83 on the next pan. Rack 39 then lifts the pan to the position shown in dotted lines in Figure 2. As arms 35 approach the limit of their swing, arm 73 forcefully engages the striker plate 81 to rock the hook member 65 and release rod 83 from engagement with hook 69. The pan then under the action of its own weight, falls until rod 83 engages hook 71. This fall from engagement at 69 to engagement at 71 results in a sudden jarring movement of the pan which discharges any clinging solids still remaining in the pan at this point. The pan is then returned to its position over its associated compartment 11; as it descends, rod 83 passes from hook 71 to engage hook 69.

As a pan moves toward the discharge station, cam 49, the cam follower 51 and the mechanism actively cooperating with them, first moves the pickup mechanism 47 to the right in Figure 6 to engage the hook member 65 with the pan holding rod 83. During the subsequent lifting movement and later during the return movement, cam 49 and its associated devices so move the pick-up mechanism on rods 43 and 45 that the point of engagement of the hook member 65 and the rod 83 does not shift along the rod 83.

The hinge mounting

The re-seating of each pan upon its return from the discharge position upon its associated compartment and its resealing engagement with the compartment is attained by providing a flexible hinge at the base of each pan. Referring particularly to hinge 41, as shown in Figure 3, I preferably mount each pan at its base on spaced hinges 41. Each of the hinges comprises a U-shaped member 87 secured by bolts 88 to the periphery of the filter bed. Pins 85 float in each of the U-shaped members 87, these being attached to arms 90, which extend from the base of each pan, the floating of the pins permitting both a radial and a limited vertical movement of the pan base with the result that the pan re-seats on the seal because, as the pan is lowered, hinge pins 85 raise or lower in the U-shaped member 87, permitting the filter pan to re-seat in an unstressed position. The use of the floating hinges thus permits repeated re-seating of each pan to provide a perfect seal without the need for highly machined hinges and their maintenance in perfect alignment.

The pan seal

To maintain an adequate seal between each pan and the filter pad to withstand the applied reduced pressure, each pan is provided on its underside with a downwardly extending rim 91, which extends completely about the lower periphery of each pan. On the outer face of rim 91 is provided a continuous rubber strip 89, this being held in place by strap 94 and bolts 96. Referring particularly to Figure 3, it will be noted that the flexible strip 89 is of such a length that it depends below the rim 91 with the lower portion of the flexible strip extending at right angles to the rim. When the pan is lowered, the flexible strip first comes into engagement with rim member 93 which extends about the periphery of each compartment 11. When the weight of slurry is placed upon the pan, the flexible member is further flexed until the rim 91 bears on the member 93, thus forcing the flexible sealing member 89 into further tight sealing engagement with the filter bed.

The slurry feed

To provide for discharge of slurry into the several filter pans without spilling of the slurry onto the adjacent edges of successive pans, slurry distributing means 152, shown particularly in Figures 4 and 5, is employed and which is mounted for rotation on the pipe 95. Pipe 95 is supported at one end by a bracket 99 depending from the overhead support, not shown, while the other end of pipe 95 is supported by means not shown. Slurry is supplied to pipe 95 and is fed through the pipe under control of valve 151. The pipe includes a slot 103 through which the slurry is discharged into the distributing device 152, the end of the pipe beyond the slot having a closure 101. The distributor 152 includes a plurality of compartments 153 arranged radially about pipe 95 between end walls 97 which ride on the pipe; each compartment 153 is made up of a plurality of radially extending walls 109 and outwardly extending walls 154 and 156, these being spaced apart to provide an elongated slot-like outlet opening 105.

A plurality of arms 107 are attached to one of the end walls 97 in such relation to the filter pans that, as appears in Figure 5, an arm 107 comes into engagement with the rim of a pan and, as the pan moves to the right in Figure 5, the feeder 152 is rotated counter-clockwise. By the time one compartment in the feeding device is moved out of position and stops feeding, a momentary lull in feeding occurs until the next compartment is moved into position for discharge of the slurry through slot opening 105. During this interval, the slurry is flowing into the next compartment but, due to the shape and position of walls 154 and 156, does not flow through the outlet from that compartment.

The filter cloth securing means

To secure the filter cloth in position and to anchor it securely against the pull exerted upon forceful discharge of the solids from the pan during the dumping cycle, the sidewalls of the pan are so fashioned that a trough-like space 113 is provided about the periphery of each pan, in which is mounted a resilient flexible base member, such as a layer of sponge rubber 113 to provide a non-rigid base to which the filter medium can be anchored in a stretched position over transverse supporting member 123 and radial supporting members 164 and which respectively extend transversely and lengthwise of the pan.

To secure the edge of the filter cloth in position in a pan, a strip of thin spring metal 117 having a preformed rubber edge 119 attached thereto is fitted about the pan and over the end of the cloth and in engagement with that portion of the cloth which is engaged with rubber base 113. The upper end of the spring metal strip is forced into a recess provided between a continuous strip member 121 and the upper edge of the sidewall 96 of the pan. This anchorage enables the cloth to be installed and removed readily and, at the same time, provides a resilient mounting, holding the cloth stretched tightly over the supports 123 and 164 and yet with a resilient mount such that the cloth is not pulled away upon forceful discharge of the contents of the pan.

Advantages

From the foregoing, I believe it will be apparent that I have provided a novel and improved filter, particularly one in which the filter cake is discharged bodily outside the confines of the filter so that it can be readily removed without interfering with the normal operations of the filter. The filter is of particular application in the manufacture of phosphoric acid from phosphate rock and sulfuric acid. Further, advantage is taken of the force imparted to the cake during its dumping to assist in its removal. This is of particular advantage in the handling of tenacious cakes which form with some materials.

The forceful discharge of the cake also results in keeping the filter cloth clean so that neither air nor liquid blow-back is required to dislodge the cake nor clean the cloth. Further, the underside of the filter portion of each pan is readily accessible for inspection and cleaning, if this should be considered desirable, during its discharge.

I claim:

1. In a filter of the class described, a circular filter bed having a plurality of generally triangularly shaped filter pans each having an apex and a base concentrically positioned with respect to said filter bed, a drainage compartment provided cooperatively in the bed under each pan, each drainage compartment corresponding substantially in area and outline to the pan superimposed over said compartment, means providing a seal between each pan and its cooperating drainage compartment, hinge means mounting each pan at its base on said bed, and means for swinging each pan on its hinge mounting means from a horizontal position on said bed wherein the pan is positioned over the compartment cooperating with the pan through about 120° to a discharge position outside the path of movement of said circular filter bed.

2. In a filter of the class described, a circular filter bed having a plurality of generally triangularly shaped filter pans each having an apex and a base concentrically positioned with respect to said filter bed, a drainage compartment provided cooperatively in the bed under each pan, each drainage compartment corresponding substantially in area and outline to the pan superimposed over said compartment, means providing a seal between each pan and its cooperating drainage compartment, hinge means mounting each pan at its base on said bed, means for rotating said bed continuously, and means at a discharge station for swinging each pan on its hinge mounting means during said continuous rotation of said bed from a horizontal position over a compartment in said bed through about 120° to a discharge position outside the path of movement of said circular filter bed.

3. In a filter of the class described, a circular filter bed having a plurality of generally triangularly shaped filter pans each having an apex and a base concentrically positioned with respect to said filter bed, a drainage compartment provided cooperatively in the bed under each pan, each drainage compartment corresponding substantially in area and outline to the pan superimposed over said compartment, means providing a seal between each pan and its cooperating drainage compartment, hinge means mounting each pan at its base on said bed, and means for engaging a pan adjacent its apex for swinging each pan on its hinge mounting means from a horizontal position over a compartment in said bed through about 120° to a discharge position outside the path of movement of said circular filter bed.

4. In a filter of the class described, a circular filter bed having a plurality of generally triangularly shaped filter pans each having an apex and a base concentrically positioned with respect to said filter bed, a drainage compartment provided cooperatively in the bed under each pan, each drainage compartment corresponding substantially in area and outline to the pan superimposed over said compartment, means providing a seal between each pan and its cooperating drainage compartment, hinge means mounting each pan at its base on said bed, means for rotating said bed continuously, and means at a discharge station for engaging a pan adjacent its apex for swinging each pan on its hinge mounting means during continuous rotation of said bed out of seating engagement with a compartment in said bed through about 120° to a discharge position outside the path of movement of said circular filter bed.

5. In a filter of the class described, a circular filter bed having a plurality of drainage compartments in said bed and a plurality of generally triangularly shaped filter pans each having an apex and a base concentrically positioned with respect to said filter bed, each pan being mounted cooperatively above a drainage compartment corresponding substantially in area and shape to said pan, hinge means mounting each pan at its base on said bed, sealing means between each pan and a compartment, and means for engaging a pan adjacent its apex for swinging each pan on its hinge mounting means from a horizontal position on said bed through about 120° to a discharge position outside the path of movement of said circular filter bed and for returning the pan following discharge of solids therefrom to a compartment sealing position on the bed.

6. In a filter of the class described, a circular filter bed having a plurality of generally triangularly shaped filter pans; each pan having an apex and a base concentric with said bed; a plurality of generally triangularly shaped filter compartments each corresponding in area and shape to that of a pan and positioned cooperatively below a pan; and a pan hinge including a pair of U-members each mounted on said bed at opposite end of the base of a pan, and a pair of pins each secured to said pan at opposite ends of the base of said pan and each movable in one of said U-members to position said pan on said bed for a swinging movement about the periphery of the bed and for a limited vertical movement with respect to said base.

7. In a filter of the class described, a circular filter bed having a plurality of generally triangularly shaped filter pans; each pan having an apex and a base concentric with said bed; a plurality of generally triangularly shaped filter compartments each corresponding in area and shape to that of a pan; and positioned cooperatively below a pan; and a hinge mounting for a pan including a pair of U-members each mounted on said bed at opposite ends of the base of each pan, and a pair of pins secured to said pan and each movable in one of said U-members to position said pan on said bed for a swinging movement about the periphery of the bed and for a limited vertical movement with respect to said base.

8. In a filter of the class described, a circular filter bed having a plurality of generally triangularly shaped filter pans, a plurality of generally triangularly shaped filter compartments, each corresponding in area and shape to that of a pan and positioned cooperatively below a pan, a continuous flexible seal provided on the bed about the perimeter of each compartment to engage the base of the superimposed pan in sealing engagement, and a hinge mounting each pan on said bed for a swinging movement about the periphery of the bed and for a limited vertical movement with respect to said bed.

9. In a filter of the class described including a filter bed and a plurality of generally triangularly shaped filter pans mounted on the bed, hinge means at the base of each pan positioned each pan on the bed for a swinging movement and for a vertical movement with respect to said bed, the bed having a pan support member thereon cooperatively adjacent the underside of each pan and extending in a generally horizontal plane and defining the upper edge of the drainage compartment provided cooperatively on said bed beneath each pan, each pan having a depending rim extending about its periphery on the underside thereof and adapted to engage the pan support member on the bed to support the pan, and a flexible seal member extending below said rim to engage the pan support member upon vertical movement of the pan substantially as the rim engages the pan support member.

References Cited in the file of this patent

UNITED STATES PATENTS

| | | |
|---|---|---|
| 678,033 | Reeves | July 9, 1901 |
| 938,636 | Browne | Nov. 2, 1909 |
| 1,028,789 | Rothwell | June 4, 1912 |
| 1,448,623 | Johnson et al. | Mar. 13, 1923 |
| 1,647,562 | Drew | Nov. 1, 1927 |
| 1,695,306 | Wiemer | Dec. 18, 1928 |
| 1,882,045 | Stevens | Oct. 11, 1932 |
| 2,188,840 | McCue | Jan. 30, 1940 |